Figure 1:
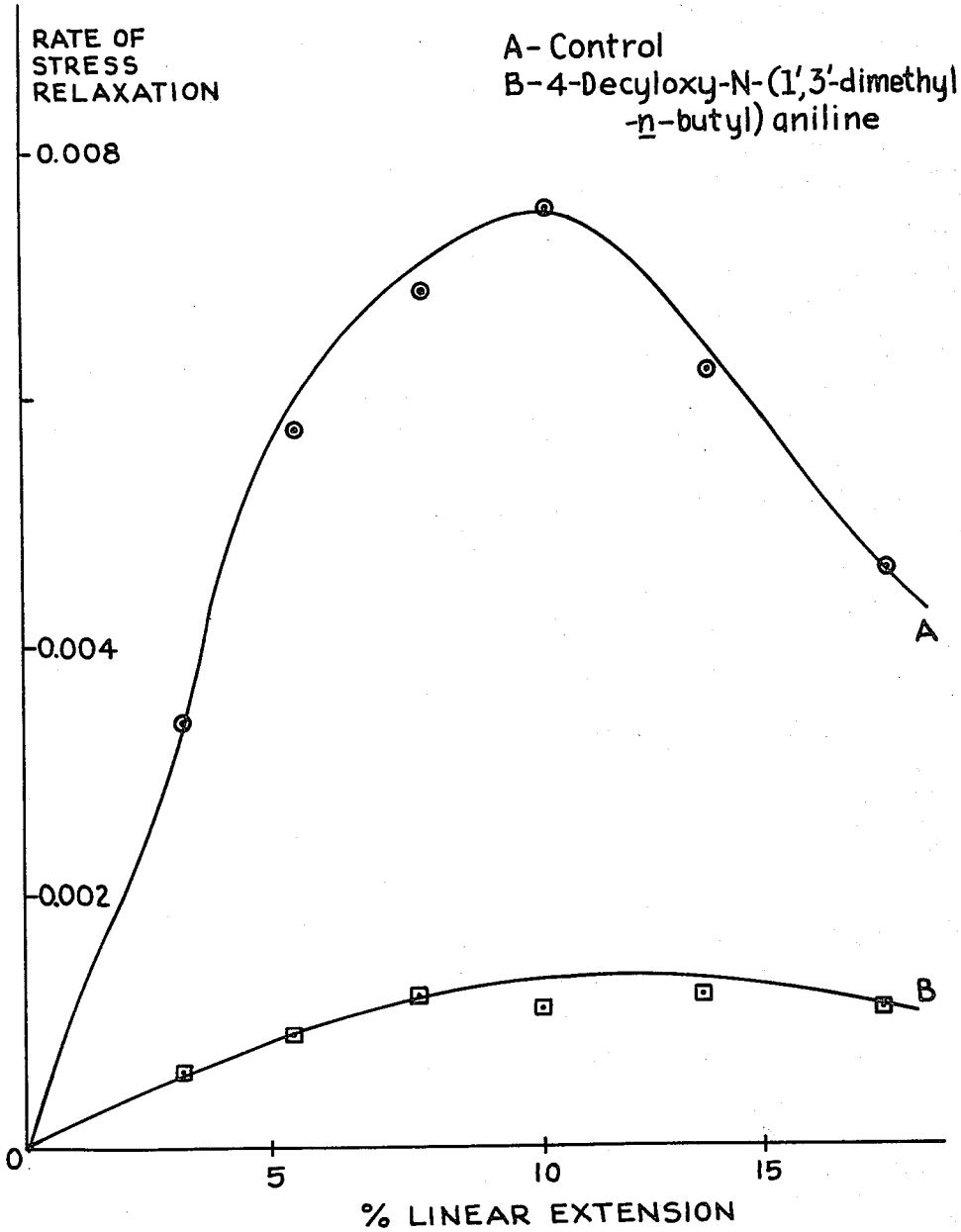

3,114,729
RUBBER ANTIDEGRADANTS
Bertrand Ernest Wilde and Marion Ilse Hedwig Wilde, Rose Lea, Pentre, Wrexham, Wales, assignors to Monsanto Chemicals Limited, London, England, a British company
Filed Feb. 16, 1959, Ser. No. 793,473
Claims priority, application Great Britain Feb. 17, 1958
13 Claims. (Cl. 260—45.9)

This invention relates to rubber chemicals that give protection against the action of oxygen and ozone, particularly for instance to compounds which do not seriously discolor rubber stocks in which they are used and which are therefore suitable for use in white and other light-colored compositions.

It is well known that vulcanized rubber is liable to deteriorate on exposure to the action of heat, light and oxygen-containing gases, and that deterioration occurs in the atmosphere under normal conditions of use. To resist this effect various substances have been proposed for use in rubber as antioxidants, but many of these suffer from the disadvantage that they cause darkening with time and badly discolor the rubber stocks in which they are incorporated if these should be of a light color. This problems does not arise with dark-colored stocks obtained using carbon blacks, for instance, but it is a serious difficulty in such compositions as the white rubber stocks obtained using zinc oxide, titanium dioxide and analogous substances.

Other deterioration which can take place in rubber is that caused by the small quantities of ozone usually present in the atmosphere. The particular effect which ozone has on rubber is that it is largely responsible for the surface cracking which can occur when rubber is subjected to distortion or extension. An ordinary rubber antioxidant does not by any means necessarily give protection against this effect of ozone. A rubber chemical which does combine both functions is conveniently termed an antidegradant.

A completely new class of antidegradants has now been discovered, the members of which are very effective antioxidants. They give a considerable measure of protection to the action of ozone, and they do not seriously discolor light-colored rubber stocks.

The present invention comprises rubber in which there is incorporated as antidegradant a substituted aniline of the formula:

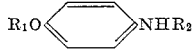

where $R_1$ is an aliphatic or an aralkyl group and $R_2$ is an alkyl group containing 6 or more carbon atoms, and where the benzene ring can contain an inactive substituent, or a salt of one of these substituted anilines.

Substituted anilines of the formula:

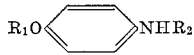

where $R_1$ is an aliphatic or an aralkyl group and $R_2$ is an alkyl group containing 6 or more carbon atoms, and where the benzene ring can contain an inactive substituent, and their salts, are new compounds and are claimed as such.

In general in the substituted anilines of the formula:

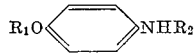

when $R_1$ is an aliphatic group this is preferably an alkyl (either straight- or branched-chain) or a cycloalkyl group; thus $R_1$ can be methyl, ethyl, n- or iso-propyl, n-, iso-, sec.- or tert.-butyl, amyl, hexyl, octyl, decyl, dodecyl or higher alkyl groups, or a cycloalkyl group such as for instance a cyclohexyl or methylcyclohexyl group. $R_2$ is an alkyl group (that is to say of course a saturated acyclic aliphatic group) containing 6 or more carbon atoms and this can be either straight or branched-chain; $R_2$ can usefully be a hexyl group, such as an n-hexyl, 1,3-dimethyl-n-butyl, or 1-ethyl-n-butyl group; a heptyl group, such as an n-heptyl or 1,3-dimethyl-n-amyl group; an octyl group, such as an n-octyl, a 1,3-dimethyl-n-hexyl or 1,5-dimethyl-n-hexyl group; an n-nonyl group; an n-decyl group; an n-dodecyl group; an n-hexadecyl group; or a substantially straight chain alkyl group derived from paraffin wax, such as a hexacosyl group. If $R_1$ is an aralkyl group this can for example be a benzyl group or an alkyl substituted benzyl group.

Preferably the substituted aniline has at least one position ortho- to the amino group that is vacant, but this is not an essential requirement and in general an inactive substituent or substituents can be present anywhere in the benzene ring. The inactive substituent can for example be a hydrocarbon group, particularly for instance an alkyl group such as a methyl, ethyl or propyl group. Examples of alkyl-substituted derivatives of this type are 2-methyl-4-methoxy-N-n-hexylaniline and 2,6-dimethyl-4-methoxy-N-n-octylaniline.

Salts of the substituted anilines which can be used are the acid-addition salts formed by treating the free base with an acid such as hydrochloric acid, or for instance an organic acid such as acetic or stearic acid. Also suitable are the quaternary ammonium salts, such as the quaternary chlorides obtained by treating the free base with an alkyl chloride.

One process of the invention is for the preparation of the new substituted anilines of formula:

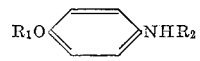

where $R_1$ is an aliphatic or an aralkyl group and $R_2$ is an alkyl group containing 6 or more carbon atoms, where the benzene ring can contain an inactive substituent, by reductive alkylation of an amine:

(or a suitable nitrogen-containing precursor such as for instance the nitro compound:

or an azo or hydrazo derivative) in the presence of an aldehyde or a ketone from which the group $R_2$ can be derived by reduction.

The second process of the invention is for the preparation of the substituted anilines of formula:

as defined above, by alkylation of the appropriate amine:

with a halide $R_2X$ where X is a halogen.

In a preferred way of carrying out the first process the appropriate amine:

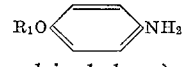

(or a precursor as explained above) and the aldehyde or ketone are subjected to reductive alkylation using hydrogen and a catalyst, for example a catalyst comprising platinum deposited on carbon. In general, whether an aldehyde or a ketone is employed depends on the nature of the group $R_2$, but this point is readily settled in any particular instance. An aldehyde is of course required if the group $R_2$ is attached to the nitrogen atom by a primary carbon atom as in —N—$CH_2$—; for instance the groups benzyl and n-hexyl can be derived from benzaldehyde and n-hexaldehyde respectively. A ketone yields a group $R_2$ in which the carbon atom joined to the nitrogen atom is a secondary one; for instance the group 1,3-dimethyl-n-butyl is obtained from methyl isobutyl ketone.

Preferably in carrying out the second process the alkylation is performed in the presence of an acid acceptor, for instance an inorganic alkaline substance such as sodium bicarbonate or sodium carbonate, or an organic base such as an amine. In the latter instance the necessary amine is conveniently provided by employing excess of the amines starting material. The reactants are preferably heated, for instance in the region of 60–120° C. Excellent results are obtained by use of a halide $R_2X$ where X is bromine; the iodides and chlorides can also be employed in suitable circumstances.

Typical new members of the class of substituted anilines are given below.

| No. | Compound | Boiling Point | | Melting Point, ° C. |
|---|---|---|---|---|
| | | ° C. | Pressure, mm. of Hg | |
| 1 | 4-Methoxy-N-n-hexylaniline | 145 | 2 | |
| 2 | 4-Methoxy-N-(1',3'-dimethyl-n-butyl)aniline. | 125 | 2 | |
| 3 | 4-Methoxy-N-n-octylaniline | 163 | 2 | |
| 4 | 2,6-Dimethyl-4-methoxy-N-n-octylaniline. | 180–188 | 1.2 | |
| 5 | 4-Methoxy-N-n-decylaniline | 181 | 2 | approx. 30 |
| 6 | 4-Methoxy-N-n-hexadecylaniline. | 233 | 2 | |
| 7 | 4-Ethoxy-N-n-hexylaniline | 147 | 2 | |
| 8 | 4-Ethoxy-N-(1',3'-dimethyl-n-butyl)aniline. | 131 | 2 | |
| 9 | 4-Ethoxy-N-n-octylaniline | 166 | 2 | |
| 10 | 4-Ethoxy-N-n-decylaniline | 185 | 2 | approx. 30 |
| 11 | 4-Ethoxy-N-n-hexadecylaniline. | 222 | 2 | 45 |
| 12 | 4-n-Hexyloxy-N-(1',3'-dimethyl-n-butyl)aniline. | 158 | 2 | |
| 13 | 4-n-Decyloxy-N-(1',3'-dimethyl-n-butyl)aniline. | 207 | 2 | |
| 14 | 4-Benzyloxy-N-(1',3'-dimethyl-n-butyl)aniline. | 185 | 2 | |
| 15 | 4-sec.-Butoxy-N-(1',3'-dimethyl-n-butyl)aniline. | 185–187 | 2 | |

The compounds 4-methoxy- and 4-ethoxy-N-n-octylanilines and 4-methoxy- and 4-ethoxy-N-n-decylanilines in particular are examples of excellent antioxidants, as well as possessing useful antiozonant activity.

Other substituted anilines with good general properties are 4-methoxy-N-(1',5'-dimethyl-n-hexyl)aniline, 4-n-butoxy-N-n-hexylaniline, 2-methyl-4-methoxy-N-n-hexylaniline, 2-methyl-4-ethoxy-N-(1',3'-dimethyl-n-butyl)aniline, 4-ethoxy-N-(1-tert.-butyl-2-methylpropyl)aniline and 4-ethoxy-N-(2-ethylhexyl)aniline.

The amount of the substituted aniline used in the rubber can vary between wide limits, but in general it has been found preferable to use from 0.2 to 3 parts by weight, and particularly from 0.5 to 2 parts by weight, per hundred parts by weight of rubber used. Amounts somewhat outside these limits can sometimes be employed, for instance from 0.1 to 5 parts of the compound per hundred parts of rubber. Very satisfactory results have been obtained using about 1 part by weight of the substituted aniline per hundred parts by weight of rubber.

The substituted anilines of the invention are effective antioxidants for both natural and synthetic rubbers. Synthetic rubbers which can be used include polymers of 1,3-butadienes, for instance 1,3-butadiene itself, and copolymers of 1,3-butadienes with other monomers, such as styrene, acrylonitrile, isobutylene or methyl methacrylate.

An indication of the non-discoloring properties in rubber of the substituted anilines of the invention was obtained by measuring the light stability of solutions of the compounds in the following way.

A solution of each of the compounds in pure propylene tetramer (an olefinic material likely to cause discoloration of the type that takes place in rubber) was made up of concentration 0.008 mol. per litre and placed in a loosely corked Pyrex test tube. These test solutions were exposed to daylight together with as a control a similarly prepared solution of a commercially available antioxidant known to have excellent non-discoloring properties in rubber, although it possessed no antiozonant activity whatsoever. At intervals of a few days the intensities of the colors developed in the solutions were compared by measuring the light absorption of each one at a wavelength of 4260 A. using an EEL photometer (1 cm. cell; filter 601). Exposure to daylight was continued until the percentage absorption by the control solution (containing the commercial antioxidant) reached 50%. The percentage absorption of each of the test solutions was of course also measured. The value of the substituted aniline as a non-discoloring additive was illustrated by the following results which give the ratio of the percentage light absorption of the test solution to the percentage light absorption of the control solution after the same exposure.

Substance: Ration, test/control
 4-methoxy-N-(1',3'-dimethyl-n-butyl)aniline ___ 0.9
 4-methoxy-N-n-octylaniline _____ 1.0
 4-methoxy-N-n-decylaniline _____ 1.1
 4-ethoxy-N-n-hexylaniline _____ 1.1
 4-n-hexyloxy-N-(1',3'-dimethyl-n-butyl)aniline _ 1.0

A value of less than one does of course signify that the substance tested possesses a better light stability than the additive against which the comparison was made, and which as has been stated was recognized in practice as having excellent non-discoloring properties as an antioxidant in rubber. In fact the results mean that the above substituted anilines, which are valuable antidegradants as is demonstrated later, also possess excellent non-discoloring properties.

The invention is illustrated by the following examples

*Example 1*

This example describes the preparation of 4-ethoxy-N-(1',3'-dimethyl-n-butyl)aniline by the reductive alkylation of p-phenetidine with methyl isobutyl ketone.

200 grams of p-phenetidine were mixed with 463 grams of methyl isobutyl ketone and 3.0 grams of a catalyst composed of carbon on which was supported 5% by weight of platinum. The mixture was heated with stirring at 100–150° C. for three hours in the presence of hydrogen under pressure; the pressure commenced at 350 pounds per square inch and as it fell to 150 during the hydrogenation, as it did several times, more hydrogen was added to raise the pressure again to 350 pounds per square inch. The mixture was cooled and filtered from the residual catalyst. The unreacted methyl isobutyl ketone was removed by distillation and the desired compound obtained by fractional distillation of the residue under reduced pressure. There were thus obtained 266 grams of 4-ethoxy-N-(1',3'-dimethyl-n-butyl)aniline having a boiling point of 131° C. under a pressure of 2 mm. of mercury.

*Example 2*

This example refers to the preparation of the novel compound 4-benzyloxy-N-(1',3'-dimethyl-n-butyl)aniline by the reductive alkylation of benzyl p-nitrophenyl ether with methyl isobutyl ketone. The benzyl p-nitrophenyl ether was itself prepared by the reaction of potassium p-nitrophenate with benzyl chloride.

266 grams of potassium p-nitrophenate were mixed with 202 grams of benzyl chloride and 1 litre of cyclohexanone. The mixture was stirred mechanically whilst being heated under reflux for 3 hours. The solution was first made alkaline by the addition of an aqueous solution of potassium hydroxide, and then subjected to steam distillation. The aqueous distillate was cooled and the solid product which separated filtered off, washed with warm water and dried in vacuo. There was produced 304 grams of brown crystals of benzyl 4-nitrophenyl ether with a melting point of 106° C.

22.9 grams or benzyl 4-nitrophenyl ether were mixed with 50 grams of methyl isobutyl ketone and 0.5 gram of a catalyst composed of carbon on which was supported 5% by weight of platinum. The mixture was heated with stirring at 100°–150° C. under a pressure of hydrogen for 1½ hours, the actual pressure varying between 1000 and 500 pounds per square inch was explained in Example 1. The mixture was cooled and filtered from residual catalyst. The unreacted ketone was removed from the filtrate by distillation, and the residual crude product purified by distillation under reduced pressure when 26.9 grams of 4 - benzyloxy-N-(1',3'-dimethyl-n-butyl)aniline was obtained with a boiling point of 185–186° C. at a pressure of 2 mm. of mercury.

*Example 3*

This example describes the preparation of 4-ethoxy-N-n-hexylaniline by alkylation of p-phenetidine with n-hexyl bromide using an excess of the amine as acid acceptor.

274 grams of p-phenetidine (2 gram mols.) were mixed with 175 grams of n-hexyl bromide (1 gram mol.). The mixture was allowed to stand at room temperature for 12 hours, and then heated at 100° C. for 5 hours. After cooling, sufficient of a 10% by weight aqueous solution of sodium hydroxide was added to make the reaction mixture alkaline. The mixture was extracted with ether and the ethereal solution washed well with water, dried with sodium sulfate, and the ether removed by distillation. Fractional distillation of the residue under reduced pressure gave a first fraction of excess p-phenetidine followed by 155 grams of 4-ethoxy-N-n-hexylaniline having a boiling range of 142° to 150° C. under 2.5 to 3 mm. of mercury. Cryoscopic determination of the molecular weight of the product in benzene gave a value of 222 as against a theoretical value of 221.

*Example 4*

4-methoxy-N-n-hexylaniline was prepared by the method described in Example 3 using as starting material n-hexyl bromide and a twofold excess of p-anisidine. Distillation of the residue under reduced pressure gave a 70% yield (based on the weight of n-hexyl bromide used as starting material) of 4-methoxy-N-n-hexylaniline having a boiling point of 145 C. under a pressure of 2 mm. of mercury.

*Example 5*

This example describes the preparation of 4-ethoxy-N-n-hexadecylaniline by alkylation of p-phenetidine with n-hexadecyl bromide using anhydrous sodium carbonate as acid acceptor.

27.4 grams of p-phenetidine (0.2 gram mol.) were mixed with 61 grams of n-hexadecyl bromide (0.2 gram mol.), 23 grams of anhydrous sodium carbonate (0.236 gram mol.) and 15 cc. of toluene. The reaction mixture was stirred and heated under reflux for 6 hours. The mixture was then cooled and a quantity of water and ether were added. The ether extract was washed well with water, dried with sodium sulfate, and the solvent removed by distillation. The residue was fractionated under reduced pressure and gave a 60% yield (based on the weight of n-hexadecyl bromide used as starting material) of the product having a boiling point of 220° to 230° C. under a pressure of 1 mm. of mercury. The distillate solidified, and had a melting point of approximately 45° C. Cryoscopic measurement of the molecular weight of the product in benzene gave a value of 363 compared with a theoretical value for 4-ethoxy-N-n-hexadecylaniline of 361.

*Example 6*

This example describes the preparation of 2,6-dimethyl-4-methoxy-N-n-octylaniline by alkylation of 2,6-dimethyl-p-anisidine with n-octyl bromide in the presence of anhydrous sodium carbonate as acid acceptor. The novel compound 2,6-di-methyl-p-anisidine was itself made from 3,5-xylenol by coupling it with sodium benzenediazotate, followed by subsequent methylation and reduction.

A solution of 128 grams of 3,5-xylenol and 80 grams of sodium hydroxide in 800 cc. water was treated with a solution of benzenediazonium chloride prepared from 93 grams of aniline. The reaction mixture was saturated with sodium chloride and the precipitated sodium 3,5-dimethyl-4-phenylazophenate removed by filtration. The sodium salt was dissolved in water and treated with an excess of glacial acetic acid to precipitate the free azo compound which was filtered off and dried to give 200 grams of 3,5-dimethyl-4-phenylazophenol having a melting point of 82 to 87° C. Two recrystallizations of the crude compound from petroleum ether (boiling point 100° to 120° C.) gave 127 grams of the purified product having a melting point of 94° to 98° C.

The azo compound was mixed with a mixture of acetone and water and treated successively with an excess of sodium hydroxide and a quantity of dimethyl sulfate equivalent to the amount of sodium hydroxide used. Acetone was removed from the reaction mixture by distillation and the mixture was then extracted with ether. The ether extract was washed successively with dilute aqueous sodium hydroxide solution and water, and then dried with sodium sulfate and the ether removed by distillation. The crude 3,5-dimethyl-4-phenylazoanisidine was reduced in aqueous ethanol by a solution of sodium hydrosulfite in dilute sodium hydroxide solution; the reduction was carried out under reflux for 3 hours. After removing the ethanol by distillation under reduced pressure the aqueous residue was made strongly alkaline with a sodium hydroxide solution and extracted with ether. The ether extract was washed with water, dried with sodium sulfate and the ether removed by distillation. Fractional distillation of the residue under reduced pressure gave an initial fraction of aniline followed by a 42% yield (based on the weight of the 3,5-dimethyl-4-phenylazophenol used as starting material) of 2,6-dimethyl-p-anisidine having a melting point of 110° to 126° C. under a pressure of 4 mm. of mercury. The distillate solidified and after recrystallization from petroleum ether (boiling point 100° to 120° C.) had a melting point of 41.5° to 43.5° C.

11.8 grams of the 2,6-dimethyl-p-anisidine (0.078 gram mol.) were mixed with 18 grams of n-octyl bromide (0.093 gram mol.), 9 grams of anhydrous sodium carbonate (0.085 gram mol), and 12 cc. of toluene. The reaction mixture was heated under reflux for 8 hours, cooled, and treated with ether and water. The product was extracted into the ether layer, which was washed with water, dried with sodium sulfate, and the ether removed by distillation. Fractional distillation of the residue under reduced pressure gave 8.9 grams of 2,6-dimethyl-4-methoxy-N-n-octylaniline as a pale yellow liquid having a boiling point of 178° to 193° C. under a pressure of 1.3 mm. of mercury.

*Example 7*

This example describes the use of certain of the substituted anilines in a white natural rubber stock, and demonstrates their antioxidant properties.

A white rubber stock of the following composition was compounded on a laboratory mill:

| | Parts by weight |
|---|---|
| Pale crepe rubber | 100 |
| Blanc fixe | 50 |
| Titanium dioxide | 5 |
| Zinc oxide | 5 |
| Stearic acid | 1 |
| Sulfur | 2.5 |
| Diphenylguanidine | 0.5 |

The stock was first made up without any addition, and then with the addition of 1 part by weight of the substituted aniline. The two stocks were respectively termed the control stock and the treated stock.

Each stock was formed into a sheet 4 mm. thick and vulcanized at 141.5° C. for 1 hour. The flat vulcanized sheets (which had retained their white color) were then cut using a rotary cutter into ring-shaped test-pieces having a diameter of 50 mm. and a radial width of 1 mm.

The effect of the substituted aniline as an antioxidant in the samples was determined by the measurement of the stress relaxation half-life at 110° C. This was measured by the method and apparatus described by Robinson and Vodden in "Industrial and Engineering Chemistry" (1955), vol. 47, page 1477. The half-life is the time taken for the stress of the sample, stretched to 100% extension, to diminish to half its value. The effect of an antioxidant is to retard the rate of chain scission in the polymer and thus increase the stress relaxation half-life. The relative activity of the tested antioxidant is then shown by the ratio of the half-lives of the treated and control stocks.

The value of the antioxidant activity of these substituted anilines is shown by the following results:

| Substance | Stress Relaxation Half-Life in Hrs. | | Ratio, Treated/ Control |
|---|---|---|---|
| | Control Stock | Treated Stock | |
| 4-Methoxy-N-n-hexylaniline | 0.88 | 2.66 | 3.02 |
| 4-Methoxy-N-n-octylaniline | 0.89 | 3.18 | 3.58 |
| 4-Methoxy-N-n-decylaniline | 0.81 | 2.96 | 3.65 |
| 4-Methoxy-N-n-hexadecylaniline | 0.89 | 2.89 | 3.23 |
| 4-Ethoxy-N-n-hexylaniline | 0.88 | 2.88 | 3.27 |
| 4-Ethoxy-N-n-octylaniline | 0.88 | 3.07 | 3.49 |
| 4-Ethoxy-N-n-decylaniline | 0.81 | 2.64 | 3.26 |
| 4-Ethoxy-N-n-hexadecylaniline | 0.88 | 2.71 | 3.08 |
| 4-(n-Decyloxy)-N-(1',3'-dimethyl-n-butyl)aniline | 0.89 | 2.84 | 3.19 |
| 4-Benzyloxy-N-(1',3'-dimethyl-n-butyl) aniline | 0.92 | 2.93 | 3.19 |

The above results show a consistently high level of antioxidant activity for the compounds concerned. 4-methoxy-N-n-octylaniline and 4-methoxy-N - n - decylaniline in particular possess excellent properties, and they are significantly better than the homologous compounds in which instead of a relatively large aliphatic group attached to the nitrogen atom there is a straight chain group having a small number of carbon atoms. Thus when 4-methoxy-N-n-butylaniline was tested it was found to give figures of 0.77 and 1.71 for the control stock and the treated stock respectively, giving a ratio of treated to control of only 2.22, compared with ratios of 3.58 and 3.65 for the comparable n-octyl and n-decyl homologues respectively.

In manufacture of rubber goods in which the product comes in contact with lacquered surfaces it is necessary to avoid ingredients which migrate and stain the lacquer during service. The antidegradants of this invention have little tendency to migrate from the rubber into the lacquer surface and are sufficiently non-staining to meet requirements for use in contact with nitrocellulose lacquers. Again, they are significantly superior to the homologous compounds in which a lower alkyl group replaces the large aliphatic group attached to the nitrogen.

*Example 8*

This example describes the use of certain of the substituted anilines in a black rubber stock, and again shows their antioxidant properties.

A rubber stock of the following composition was compounded on a laboratory mill:

| | Parts by weight |
|---|---|
| Smoked sheets | 100 |
| Carbon black | 50 |
| Mineral oil based processing agent (Tackol 2) | 3 |
| Zinc oxide | 5 |
| Stearic acid | 3 |
| Sulfur | 2.5 |
| N-cyclohexyl-2-benzthiazyl-sulfenamide | 0.4 |

The stock was first made up without any antioxidant, and then with the addition of 1 part by weight of the test material. The two stocks were respectively termed the control and the treated stocks.

Each stock was formed into a sheet 4 mm. thick and vulcanized by heating at 141.5° C. for 30 minutes. The vulcanized sheets were then cut into test pieces as described in Example 7.

The antioxidant activity imparted to the black stock by the inclusion of the test material was measured as in Example 7. An illustration of the value of these substituted anilines as rubber antioxidants is provided by the following results:

| Substance | Stress Relaxation Half-Life in Hrs. | | Ratio, Treated/ Control |
|---|---|---|---|
| | Control Stock | Treated Stock | |
| 4-Methoxy-N-n-hexylaniline | 0.27 | 0.98 | 3.62 |
| 4-Ethoxy-N-(1',3'-dimethyl-n-butyl) aniline | 0.27 | 1.08 | 4.00 |
| 4-Ethoxy-N-n-octylaniline | 0.27 | 1.03 | 3.80 |
| 4-(n-Hexyloxy)-N-(1'-3'-dimethyl-n-butyl)aniline | 0.27 | 1.17 | 4.33 |
| 4-Benzyloxy-N-(1',3'-dimethyl-n-butyl) aniline | 0.27 | 0.98 | 3.63 |

*Example 9*

This example describes the use of various of the substituted anilines in a natural rubber stock, and illustrates the antiozonant properties as distinct from the antioxidant properties of the compounds.

A rubber stock of the following composition was compounded on a laboratory mill:

| | Parts by weight |
|---|---|
| Smoked sheets | 100 |
| Carbon black | 50 |
| Mineral oil based processing agent (Tackol 2) | 3 |
| Zinc oxide | 5 |
| Stearic acid | 3 |
| Sulfur | 2.5 |
| N-cyclohexyl-2-benzthiazyl-sulfenamide | 0.4 |

The stock was first made up without any other addition as a control stock, and then a series of stocks was made up with the addition of three parts by weight of each of the substances to be tested. Portions of each stock were moulded into the shape of a rubber band and vulcanized by heating at 141.5° C. for 30 minutes. The resulting band-shaped test pieces were roughly rectangular, with rounded ends and internal dimensions of 3 inches by ⅝ inch; they were 4 mm. wide and 1 mm. thick.

The antiozonant activity imparted to the stocks was measured by means of the test described below.

The basis of the test is the fact that the presence of surface cracks owing to the effect of ozone in a stretched sample of rubber causes a rapid relaxation of the stress present in the sample. The effect as an antiozonant of a substance can therefore be estimated by measuring the rate of stress relaxation of a sample of rubber treated with the substance to be tested. The stress relaxation rates are measured for a series of different linear extensions.

These measurements are made under two different sets of conditions: under static strain, where the sample is subjected to a constant linear extension, and under dynamic strain, where the sample is continually stretched first to a constant linear extension and then released, at a frequency of 60 times per minute.

For the tests under static strain the apparatus employed was essentially that described for measurement of antioxidant activity by Robinson and Vodden in "Industrial and Engineering Chemistry" (1955), vol. 47, page 1477. However, the apparatus was operated at room temperature instead of 110° C., and in an atmosphere of air containing traces of ozone (about 7 parts per million) instead of an atmosphere of air alone.

For the tests under dynamic strain the apparatus was further modified so that the necessary reciprocal motion could be given to one of the two pulleys on which the band-shaped test piece was mounted.

In carrying out a test one of the band-shaped test pieces was extended on the two pulleys of the apparatus by a constant amount and the stress noted that was necessary to maintain this extension. The stress was found to decrease in a logarithmic relationship with time. Measurements were made at different degrees of extension and a graph plotted of rate of stress relaxation against percentage linear extension. These measurements are carried out under both static strain and dynamic strain.

In the present example the necessary measurements under both static and dynamic strain were made for the stocks to be tested and the control stock, and a series of graphs were drawn comparing the properties of the stocks containing the substituted anilines with the control.

In all the graphs the rate of cracking of the rubber stock (as measured by rate of stress relaxation) passed through a maximum value at approximately 10% linear extension, and a typical graph is given in FIGURE 1, in which the properties of the stock containing 4-decyloxy-N-(1',3'-dimethyl-n-butyl)aniline are compared with the control, under static strain. It can be seen that the stress relaxation rate "peak" for the treated stock is very much lower indeed than the control, and the 4-decyloxy-N-(1',3'-dimethyl-n-butyl)aniline has accordingly afforded a substantial degree of antiozonant protection to the stock.

For each of the treated stocks there was calculated from the appropriate graph the "peak ratio," that is the ratio of the peak rate for the treated stock. The extent to which the figure obtained for this ratio was greater than unity was a measure of the antiozonant value of the compound tested.

The peak ratio values obtained for each of the substituted anilines tested are given below:

| Substance | Peak Ratio | |
|---|---|---|
| | Static Strain | Dynamic Strain |
| 4-Methoxy-N-n-decylaniline | 4.2 | 3.9 |
| 4-Ethoxy-N-n-hexylaniline | 4.2 | 6.4 |
| 4-Ethoxy-N-(1',3'-dimethyl-n-butyl)aniline | 3.0 | 6.2 |
| 4-Ethoxy-N-n-octylaniline | 2.9 | 4.8 |
| 4-Ethoxy-N-n-decylaniline | 3.4 | 3.9 |
| 4-n-Decyloxy-N-(1',3'-dimethyl-n-butyl)aniline | 5.6 | 5.8 |
| 4-Benzyloxy-N-(1',3'-dimethyl-n-butyl)aniline | 4.1 | 5.2 |

It can be seen that all the figures are well above unity and do in fact represent useful antiozonant activity. The well-established commercial antiozonant 6-ethoxy-2,2,4-trimethyl - 1,2 - dihydroquinoline (which does however cause discoloration of the rubber) gives an average peak ratio in a similar test of 2.0–2.5.

*Example 10*

This example illustrates the use of certain of the substituted anilines as antiozonants in a styrene-butadiene synthetic rubber stock, and compares their effectiveness with the established antiozonant 6-ethoxy-2,2,4-trimethyl-1,2-dihydroquinoline.

A rubber stock of the following composition was compounded on a laboratory mill:

| | Parts by weight |
|---|---|
| Synthetic rubber | 100 |
| Carbon black | 50 |
| Zinc oxide | 4 |
| Stearic acid | 2 |
| Mineral oil based processing agent (Tackol 2) | 8 |
| Sulfur | 2 |
| N-cyclohexyl-2-benzthiazyl-sulfenamide | 1.2 |

The synthetic rubber was a GR–S styrene-butadiene copolymer sold as Krylene NS.

The stock was first made up with the addition of 3 parts by weight of 6-ethoxy-2,2,4-trimethyl-1,2-dihydroquinoline, and then stocks were made up with the addition of 3 parts by weight of each of the two substances to be tested. Band-shaped test pieces were moulded as described in Example 9, and the antiozonant protection given to the stocks was tested also as described in that example. The graphs obtained were similar in principle to those of Example 9, and again the peaks occurred at about a 10% linear extension.

However, in calculating the "peak ratio" the peak rate of stress relaxation for the commercial antiozonant stock was compared with the peak rate for the treated stock. The peak ratios were found to be greater than 1, which indicated the extent to which the substituted anilines tested were superior to the commercial antiozonant. The results were:

| Substance | Peak Ratio | |
|---|---|---|
| | Static Strain | Dynamic Strain |
| 4-Ethoxy-N-(1',3'-dimethyl-n-butyl)aniline | 2.6 | 1.9 |
| 4-Ethoxy-N-n-hexylaniline | 2.6 | 1.5 |

It is intended to cover all changes and modifications of the examples of the invention herein chosen for purposes of disclosure which do not constitute departures from the spirit and scope of the invention.

What is claimed is:

1. Sulfur vulcanizable diene rubber in which there is incorporated a small amount within the range of 0.1 to 5 parts by weight per 100 parts by weight of rubber, sufficient to inhibit degradation, of an antidegradant of the structure

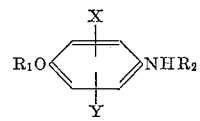

where $R_1$ is a member of a group consisting of an alkyl group of 1 to 12 carbon atoms, cyclohexyl, methylcyclohexyl and benzyl, $R_2$ is an acyclic alkyl group containing 6 to 26 carbon atoms and X and Y are members of a group consisting of hydrogen and lower alkyl of 1 to 3 carbon atoms.

2. Sulfur vulcanizable diene rubber in which there is incorporated a small amount within the range of 0.1 to 5 parts by weight per 100 parts by weight of rubber, sufficient to inhibit degradation, of an antidegradant of the structure

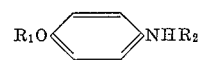

where $R_1$ is benzyl and $R_2$ is an acyclic alkyl group containing 6 to 10 carbon atoms inclusive.

3. Sulfur vulcanizable diene rubber in which there is incorporated a small amount within the range of 0.1 to 5 parts by weight per 100 parts by weight of rubber, sufficient to inhibit degradation, of an antidegradant of the structure

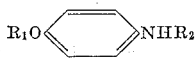

where $R_1$ is an alkyl group of 1 to 12 carbon atoms and $R_2$ is an acyclic alkyl group containing 6 to 16 carbon atoms inclusive.

4. Sulfur vulcanizable diene rubber in which there is incorporated a small amount within the range of 0.1 to 5 parts by weight per 100 parts by weight of rubber, sufficient to inhibit degradation, of an antidegradant of the structure

where $R_1$ is a secondary alkyl group of 3 to 12 carbon atoms and $R_2$ is acyclic secondary alkyl group containing at least six carbon atoms but less than nine.

5. Sulfur vulcanizable diene rubber in which there is incorporated a small amount within the range of 0.1 to 5 parts by weight per 100 parts by weight of rubber, sufficient to inhibit degradation, of 4-benzyloxy-N-(1',3'-dimethyl-n-butyl)aniline.

6. Sulfur vulcanizable diene rubber in which there is incorporated a small amount within the range of 0.1 to 5 parts by weight per 100 parts by weight of rubber, sufficient to inhibit degradation, of 4-sec.-butoxy-N-(1',3'-dimethyl-n-butyl)aniline.

7. Sulfur vulcanizable diene rubber in which there is incorporated a small amount within the range of 0.1 to 5 parts by weight per 100 parts by weight of rubber, sufficient to inhibit degradation, of 4-methoxy-N-n-octyl-aniline.

8. Sulfur vulcanizable diene rubber in which there is incorporated a small amount within the range of 0.1 to 5 parts by weight per 100 parts by weight of rubber, sufficient to inhibit degradation, of 4-n-decyloxy-N-(1',3'-dimethyl-n-butyl)aniline.

9. Sulfur vulcanizable diene rubber in which there is incorporated a small amount within the range of 0.1 to 5 parts by weight per 100 parts by weight of rubber, sufficient to inhibit degradation, of 4-ethoxy-N-(1',3'-dimethyl-n-butyl)aniline.

10. Vulcanized natural rubber having incorporated therein a small amount within the range of 0.1 to 5 parts by weight per 100 parts by weight of rubber, sufficient to inhibit degradation, of an antidegradant of the structure

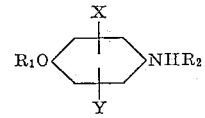

where $R_1$ is a member of a group consisting of an alkyl group of 1 to 12 carbon atoms, cyclohexyl, methylcyclohexyl and benzyl, $R_2$ is an acyclic alkyl group containing 6 to 26 carbon atoms and X and Y are members of a group consisting of hydrogen and lower alkyl of 1 to 3 carbon atoms.

11. Vulcanized natural rubber having incorporated therein a small amount within the range of 0.1 to 5 parts by weight per 100 parts by weight of rubber, sufficient to inhibit degradation, of an antidegradant of the structure

where $R_1$ is benzyl and $R_2$ is an acyclic alkyl group containing 6 to 10 carbon atoms inclusive.

12. Vulcanized styrene-butadiene copolymer rubber having incorporated therein a small amount within the range of 0.1 to 5 parts by weight per 100 parts by weight of rubber, sufficient to inhibit degradation, of an antidegradant of the structure

where $R_1$ is an alkyl group of 1 to 12 carbon atoms and $R_2$ is an acyclic alkyl group containing 6 to 16 carbon atoms inclusive.

13. Vulcanized styrene-butadiene copolymer rubber having incorporated therein a small amount within the range of 0.1 to 5 parts by weight per 100 parts by weight of rubber, sufficient to inhibit degradation, of an antidegradant of the structure

where $R_1$ is a secondary alkyl group of 3 to 12 carbon atoms and $R_2$ is acyclic secondary alkyl group containing at least six carbon atoms but less than nine.

References Cited in the file of this patent

UNITED STATES PATENTS

| | | |
|---|---|---|
| 2,105,806 | Clifford | Jan. 18, 1938 |
| 2,166,223 | Semon | July 18, 1939 |
| 2,300,246 | Chenicekl et al. | Oct. 27, 1942 |
| 2,435,411 | Soday | Feb. 3, 1948 |
| 2,586,837 | Linch | Feb. 26, 1952 |
| 2,651,621 | Hill et al. | Sept. 8, 1953 |
| 2,666,791 | Weinmayr | Jan. 19, 1954 |
| 2,771,368 | Thompson | Nov. 20, 1956 |
| 2,802,810 | Bill | Aug. 13, 1957 |
| 2,813,124 | Rice et al. | Nov. 12, 1957 |
| 2,829,121 | Leeper | Apr. 1, 1958 |
| 2,926,155 | Greene | Feb. 23, 1960 |

FOREIGN PATENTS

| | | |
|---|---|---|
| 430,335 | Great Britain | June 11, 1935 |